United States Patent
Hamilton, II et al.

(10) Patent No.: US 6,785,695 B1
(45) Date of Patent: Aug. 31, 2004

(54) SYSTEM AND METHOD FOR OPERATIONAL ASSISTANCE DURING SYSTEM RESTORATION

(75) Inventors: Rick Allen Hamilton, II, Charlottesville, VA (US); Steven Jay Lipton, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 09/692,395

(22) Filed: Oct. 19, 2000

(51) Int. Cl.⁷ .............................................. G06F 17/30
(52) U.S. Cl. ...................................................... 707/204
(58) Field of Search ................................ 707/204, 200

(56) References Cited

U.S. PATENT DOCUMENTS

| | | | |
|---|---|---|---|
| 5,043,866 A | | 8/1991 | Myre, Jr. et al. ............ 707/202 |
| 5,201,044 A | * | 4/1993 | Frey, Jr. et al. ................ 714/20 |
| 5,721,918 A | | 2/1998 | Nilsson et al. ............... 707/202 |
| 5,902,115 A | * | 5/1999 | Katayama ................. 434/307 A |
| 5,931,947 A | * | 8/1999 | Burns .......................... 713/201 |
| 5,946,698 A | | 8/1999 | Lomet .......................... 707/202 |
| 6,047,294 A | * | 4/2000 | Deshayes et al. ............ 707/204 |
| 6,279,011 B1 | * | 8/2001 | Muhlestein ................... 707/204 |
| 6,324,581 B1 | * | 11/2001 | Xu et al. ...................... 709/229 |
| 6,353,878 B1 | * | 3/2002 | Dunham ....................... 711/162 |
| 6,366,987 B1 | * | 4/2002 | Tzelnic et al. ............... 711/162 |
| 6,378,031 B1 | * | 4/2002 | Kuno et al. ...................... 711/4 |
| 6,381,632 B1 | * | 4/2002 | Lowell ......................... 709/203 |
| 6,453,325 B1 | * | 9/2002 | Cabrera et al. .............. 707/204 |
| 6,496,977 B1 | * | 12/2002 | Hamilton, II et al. ....... 717/168 |
| 6,501,905 B1 | * | 12/2002 | Kimura ........................ 386/126 |

* cited by examiner

*Primary Examiner*—John Breene
*Assistant Examiner*—Cheryl Lewis
(74) *Attorney, Agent, or Firm*—Joseph T. Van Leeuwen; David A. Mims, Jr.

(57) ABSTRACT

A system and method for automatically backing up logical entity data. Filesystems within the computer system are identified and data pertaining to the filesystem is recorded to backup storage. Recorded data includes the filesystem name, size, mount points, logical volumes, and logical volume groups. The logical entity backup process records the logical volume group names, the disk identification data associated with the logical volumes, the Internet Protocol (IP) addresses that have been set for the computer system, gateway address information for accessing a gateway computer, and netmask information. The backup process backs the logical entity data to nonvolatile storage either in a removable media or to a computer network storage device that is connected to the computer system through a computer network. The recovery process reads the recorded logical entity data and first restores the data to the computer system in order to establish the logical entities that existed on the computer system prior to the failure. After the logical entities are established, file and directory data are recovered using the same commercial software used to backup such data.

15 Claims, 8 Drawing Sheets

SYSTEM AND METHOD FOR OPERATIONAL ASSISTANCE DURING SYSTEM RESTORATION

BACKGROUND OF THE INVENTION

1. Technical Field

The present invention relates in general to a method and system for assisting the operator during system restoration. More particularly, the present invention relates to a system and method for automating restoration processes performed during bare-metal restore operations.

2. Description of the Related Art

Computer systems in general and International Business Machines (IBM) compatible personal computer systems in particular have attained widespread use for providing computer power to many segments of today's modern society. Systems with microprocessors are finding themselves in an array of smaller and more specialized objects that previously were largely untouched by computer technology. Computer systems typically include a system processor and associated volatile and non-volatile memory, a display area, input means, and often interfaces, such as a network interface or modem, to other computing devices.

These computing devices are information handling systems which are designed primarily to give independent computing power to a single user, or a group of users in the case of networked computing devices. Personal computing devices are often inexpensively priced for purchase by individuals or businesses. Nonvolatile storage devices such as hard disks, CD-ROM drives and magneto-optical drives are considered to be peripheral devices. Computing devices are often linked to one another using a network, such as a local area network (LAN), wide area network (WAN), or other type of network, such as the Internet.

One of the distinguishing characteristics of these systems is the use of a system board to electrically connect these components together. At the heart of the system board is one or more processors. System manufacturers continually strive for faster, more powerful processors in order to supply systems for demanding applications.

These computer systems are more and more complex and store increasing amounts of data. Backup and recovery procedures are very important. Rapid recovery from catastrophic failure is an important part of an individual's and an organization's disaster recovery procedure. As business operations move into a 24 by 7 operational mode and customers become increasingly reliant upon a company's continual Internet web presence, computer downtime may be measured in thousands, or millions, of dollars per hour. When disaster strikes, tools that enable the organization to recover its systems fast are critical.

While most organizations today use complex file backup and recovery software (such as IBM's Tivoli Systems Manager (TSM)), such software is challenged by today's business environment. Today's backup software accepts user inputs regarding data sets to be backed up and manages media and retention issues so files and directories may be restored by the system administrator when needed. Today's backup and recovery software replace unexpired files and directories into UNIX filesystems when needed. A challenge of today's backup and recovery software for UNIX systems, however, is that files and directories can only be restored after all operating system-level data constructs have been manually replaced. Manual restoration of logical entity data is tedious, time consuming, and prone to error. The system administrator must often find and use documentation detailing the names, locations, and sizes of the logical entity data.

What is needed, therefore, is a method for automating bare-metal restoration processing steps needed to prepare a computer system for data file restoration.

SUMMARY

It has been discovered that logical entity data can be automatically backed up using software designed to identify filesystems within the computer system and record data pertaining to the filesystem to backup storage. Backup data includes the filesystem name, size, mount points, logical volumes, and logical volume groups. After the logical entity data is backed up, the file data and directory information is backed up using conventional backup software. The logical entity backup process also records the logical volume group names, the disk identification data associated with the logical volumes, the Internet Protocol (IP) addresses that have been set for the computer system, gateway address information for accessing a gateway computer, and netmask information. The backup process backs the logical entity data to nonvolatile storage either in a removable media or to a computer network storage device that is connected to the computer system through a computer network.

When the computer system needs to be restored, the logical entity data is first restored to the computer system in order to establish the logical entities that existed on the computer system prior to the failure. After the logical entities are established, the file and directory data is recovered using the same commercial software used to backup such data.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
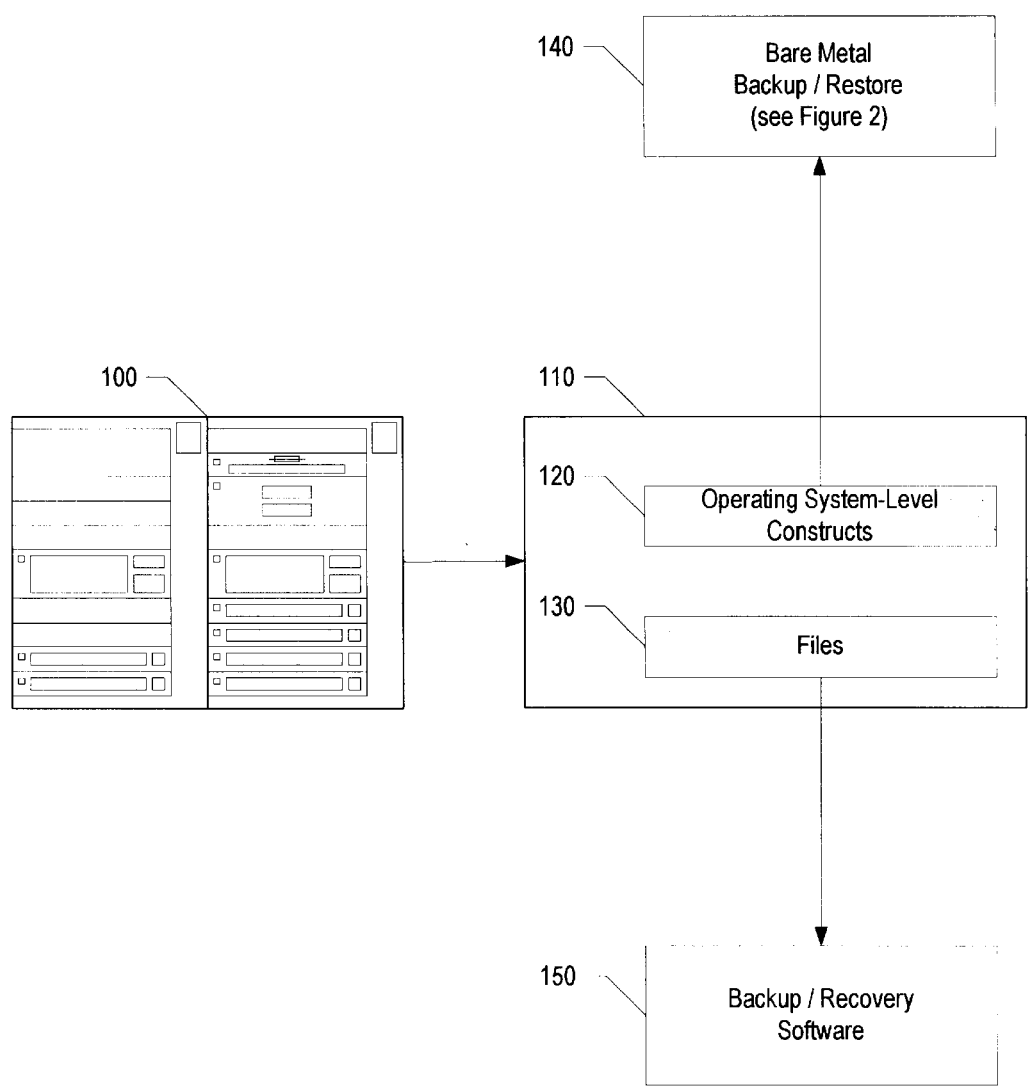
FIG. 1 is system diagram showing the two different types of data to be backed up.

FIG. 1 depicts a block diagram of components involved in backing up and restoring computer system 100. Internals 110 of computer system 100 include operating system-level constructs 120 and data files 130. Data files 130 are backed up and restored using commercially available backup and recovery software 150. Before data files 130 can be restored, operating system-level constructs 120 must be restored to computer system 100. Restoration of operating system-level constructs is also called "bare metal" restoration. Bare metal backup and restore processing 140 is used to backup and restore operating system level constructs 120.

Figure 2:
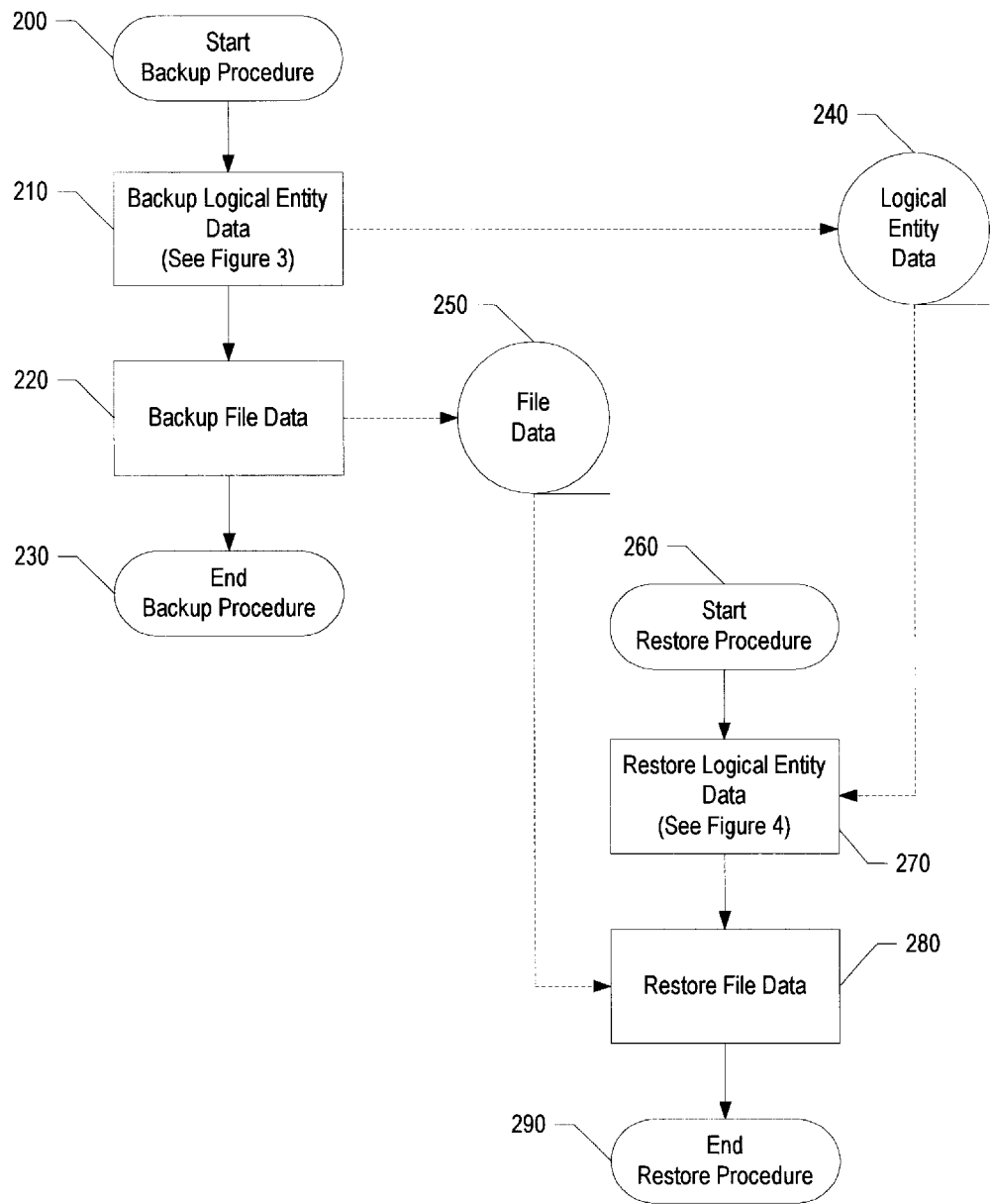
FIG. 2 is a high-level flowchart showing the backup and recovery procedures.

FIG. 2 shows a flowchart for backing up computer system 100. Processing commences at 200 whereupon backup logical entity data (step 210) is performed (see FIG. 3 for further details involved in backing up logical entity data). Logical entity data is shown being backup up to nonvolatile storage 240. In one embodiment, nonvolatile storage 240 is removable media, such as a magnetic tape, CD-RW, optical disk, etc. In another embodiment, logical entity data is backed up to nonvolatile storage connected to the computer system via a computer network, such as a local area network (LAN), a wide area network (WAN), an intranet, or the Internet. Using a network approach allows the restoration process to be performed from any computer system (with proper security credentials) connected to the computer network. In this manner, data backed up from a computer system that subsequently encounters a catastrophic failure can be restored to a replacement computer system attached to the network. Backup of file data (step 220) is performed after backup of logical entity data (step 210). Backup of file data is performed using commercially available backup software programs such as IBM's Tivoli Systems Managers™. Similarly to backup of logical entity data (step 210), backup of file data (step 220) is shown being backed up to nonvolatile storage (nonvolatile storage 250). Again, the nonvolatile storage may either be removable storage or may be network connected storage. Backup processing then terminates at step 230. A subsequent restoration of the computer system is shown commencing at 260. Restoration of logical entity data (step 270) reads nonvolatile storage 240 to restore the logical entity data to the computer system (see FIG. 4 for further details involved in restoring logical entity data). After the logical entity data has been restored, data file restoration (step 280) executes to restore the data files to the computer system. Data file restoration uses commercially available software, ideally the same software used to backup the data files in step 220, to restore the data files to the computer system. After both the logical entity data and data files have been restored, the computer system is fully restored into a state substantially similar to the state the computer system existed when it was backed up. Restoration processing then terminates at step 290.

Figure 3:
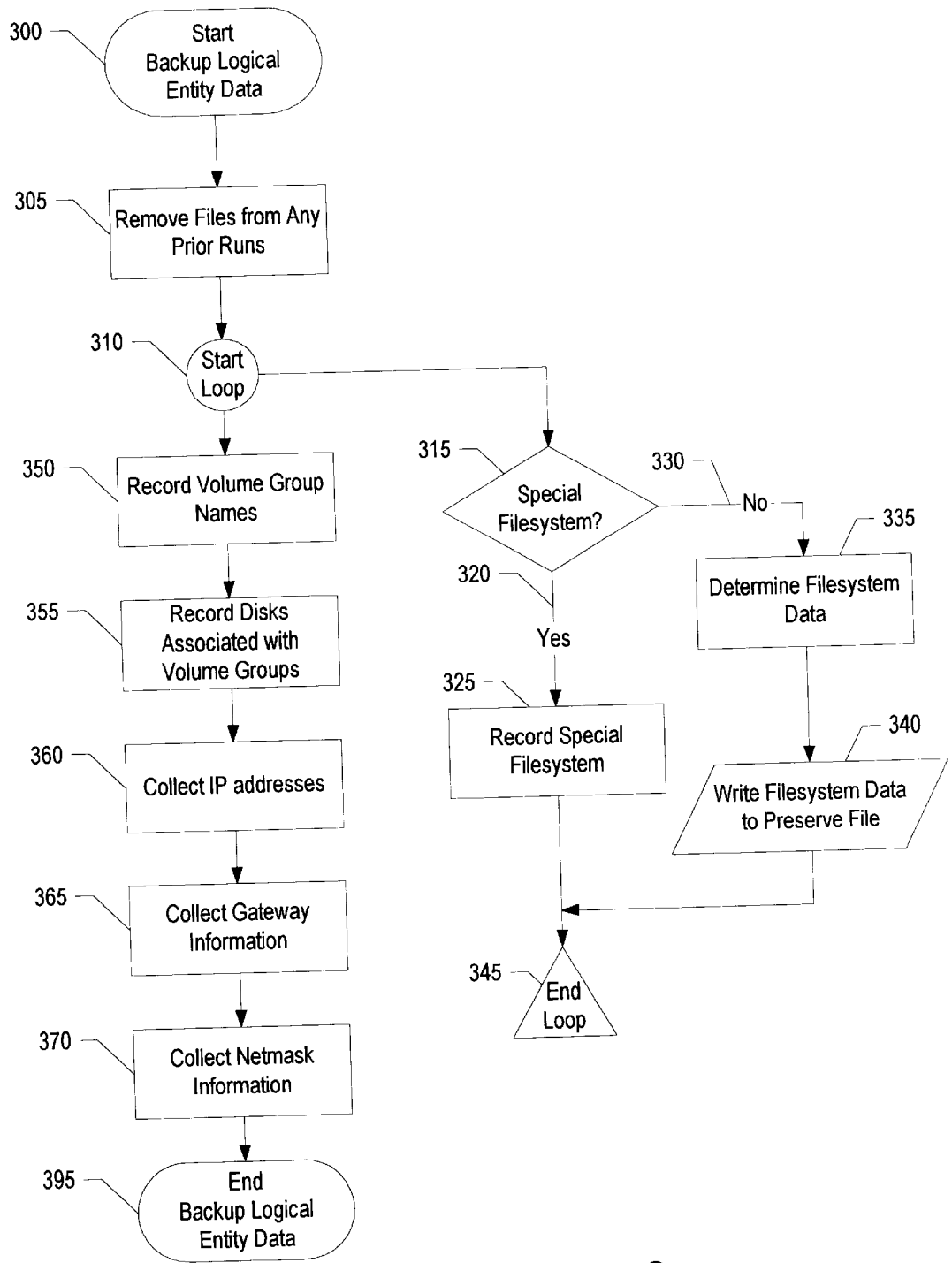
FIG. 3 is a flowchart showing the backup procedure for backing up logical entity data.

FIG. 3 shows a flowchart depicting the detailed processing that occurs when backing up the logical entity data from the computer system. Processing commences at step 300 whereupon any temporary files left on the computer system during any prior runs are removed. Each filesystem that exists on the computer system are processed in a processing loop. The loop starts at step 310 and terminates at end step 345. The first filesystem is analyzed to determine if it is a special filesystem (decision 315). A special filesystem is a filesystem that should not be modified, such as an "automounted" filesystem or boot logical volumes (LVs). The presence of special filesystems is noted so that operations will not be conducted against them. If the filesystem is a special filesystem, "yes" branch 320 is taken whereupon the special filesystem is recorded (step 325) before the loop iterates at 345 and processes the next filesystem. If the filesystem is not a special filesystem, "no" branch 330 is taken whereupon the filesystem data is identified (step 335) and then written to nonvolatile storage (output 340). Filesystem data includes the filesystem size, corresponding logical volumes, mount points, and volume groups. This information is stored in a specially-preserved file on nonvolatile storage and will provide information during a subsequent restoration process whenever such restoration is needed. After the filesystem data is preserved, loop processing iterates at 345 to process the next filesystem included in the computer system. The filesystem processing (steps between loop start 310 and loop iterate 345) continue until all filesystems included in the computer system have been processed.

After the filesystems have been processed, the names of the volume groups are recorded onto nonvolatile storage (step 350). Information about the disks associated with the volume groups is also recorded (step 355). The recording of this information will allow subsequent reconstruction of the appropriate volume groups into which the logical volumes and filesystems will be placed during any subsequent restoration process.

IP addresses are collected and stored to nonvolatile storage (step 360) along with network gateway information (step 365), and netmask information (step 370). The IP addresses, gateway information, and netmask information will allow subsequent reconstruction of network settings to allow the computer system to reattach to the computer network without manually tracking down network information. After necessary information has been identified and stored to nonvolatile storage, backup of logical entity data terminates at 395.

Figure 4:
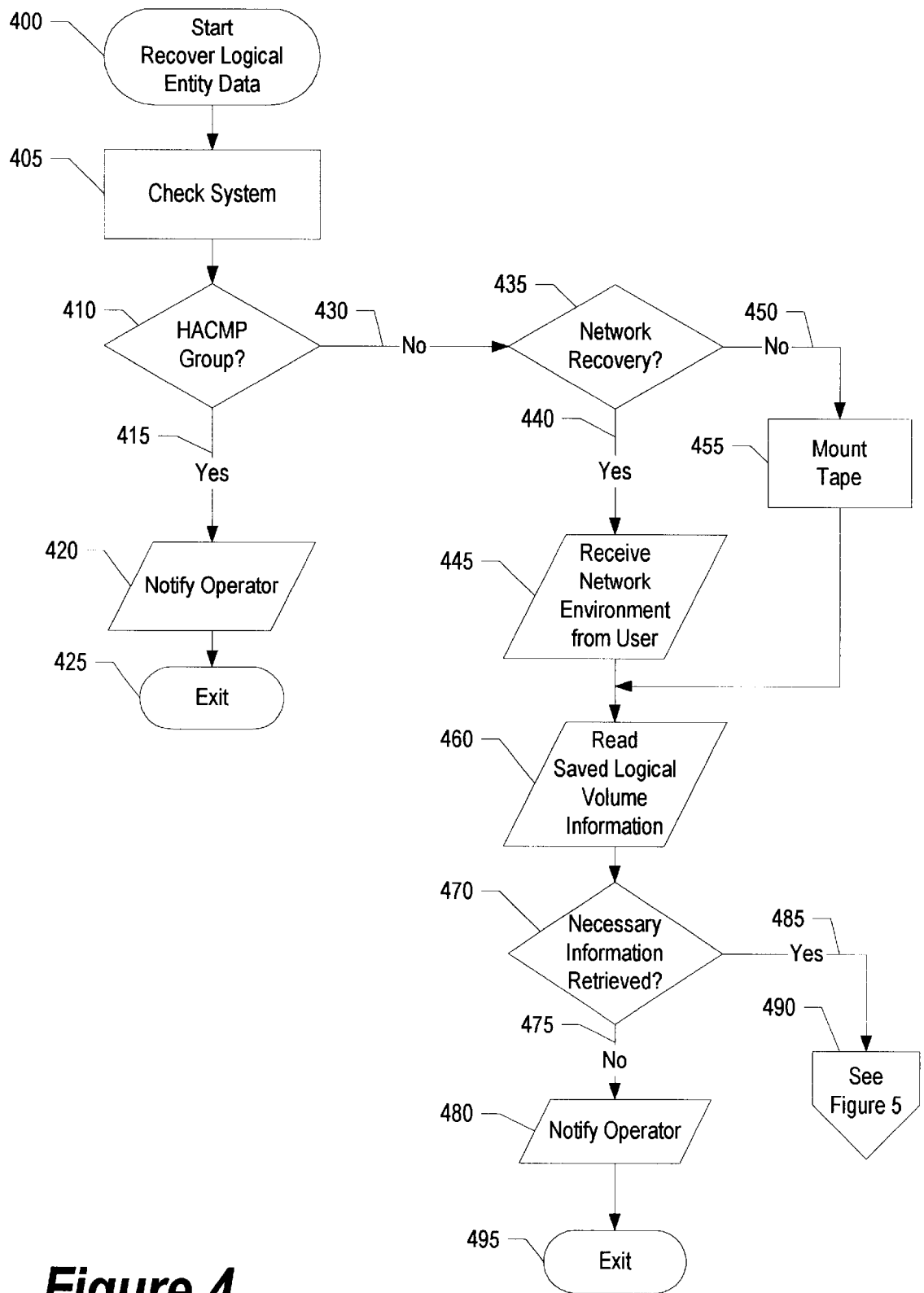
FIG. 4 is a flowchart for recovering logical entity data.

FIG. 4 shows a flowchart depicting the steps involved in restoring logical entity data to a computer system. Processing commences at step 400. In one embodiment, a check is made to ensure that the system is not part of a High Availability Cluster Multi-Processing (HACMP) group. In this embodiment, the logical volume management activities within an HACMP cluster are managed from within cluster management software. Consequently, if the system is part of a HACMP group, decision 410 branches to "yes" branch 415 whereupon the operator of the computer system is notified that the cluster management software should be used to restore the system (output 420) and processing terminates at 425.

On the other hand, if the system is not part of an HACMP group, "no" branch 430 is taken before another decision is made determining the type of restoration being performed (decision 435). The operator is prompted as to whether the restoration is a network backup (i.e., files are restored from a network connected storage device), or a removable media restoration (i.e., files are restored from removable media such as a tape, removable disk, etc.). If the restoration is a network recovery, "yes" branch 440 is taken whereupon network environment information is received from the user (input 445). In one embodiment, the computer system that is being restored contacts the Tivoli Storage Manager (TSM) server and requests the saved logical volume information. The saved logical volume information is extracted to the computer system to permit commencement of the actual reconstruction process. Network environment information includes the hostname, the internet protocol (IP) address, netmask, name server, along with other network specific data. On the other hand, if the restoration is not a network recovery, "no" branch 450 is taken whereupon the operator is instructed to mount the removable media and the removable media is in turn mounted (step 455). Once the appropriate nonvolatile media is identified (either removable media or network connected nonvolatile storage), the backup data is analyzed to ensure that necessary information is retrievable (input 460). If the necessary information is retrieved, decision 470 branches to "yes" branch 485 whereupon further logical entity data recovery processing continues (off-page connector 490, see FIG. 5 for further details). On the other hand, if necessary information is not available, recovery processing cannot continue. In this case, "no" branch 475 is taken whereupon the operator is notified of the error (output 480) before processing terminates at 495.

Figure 5:
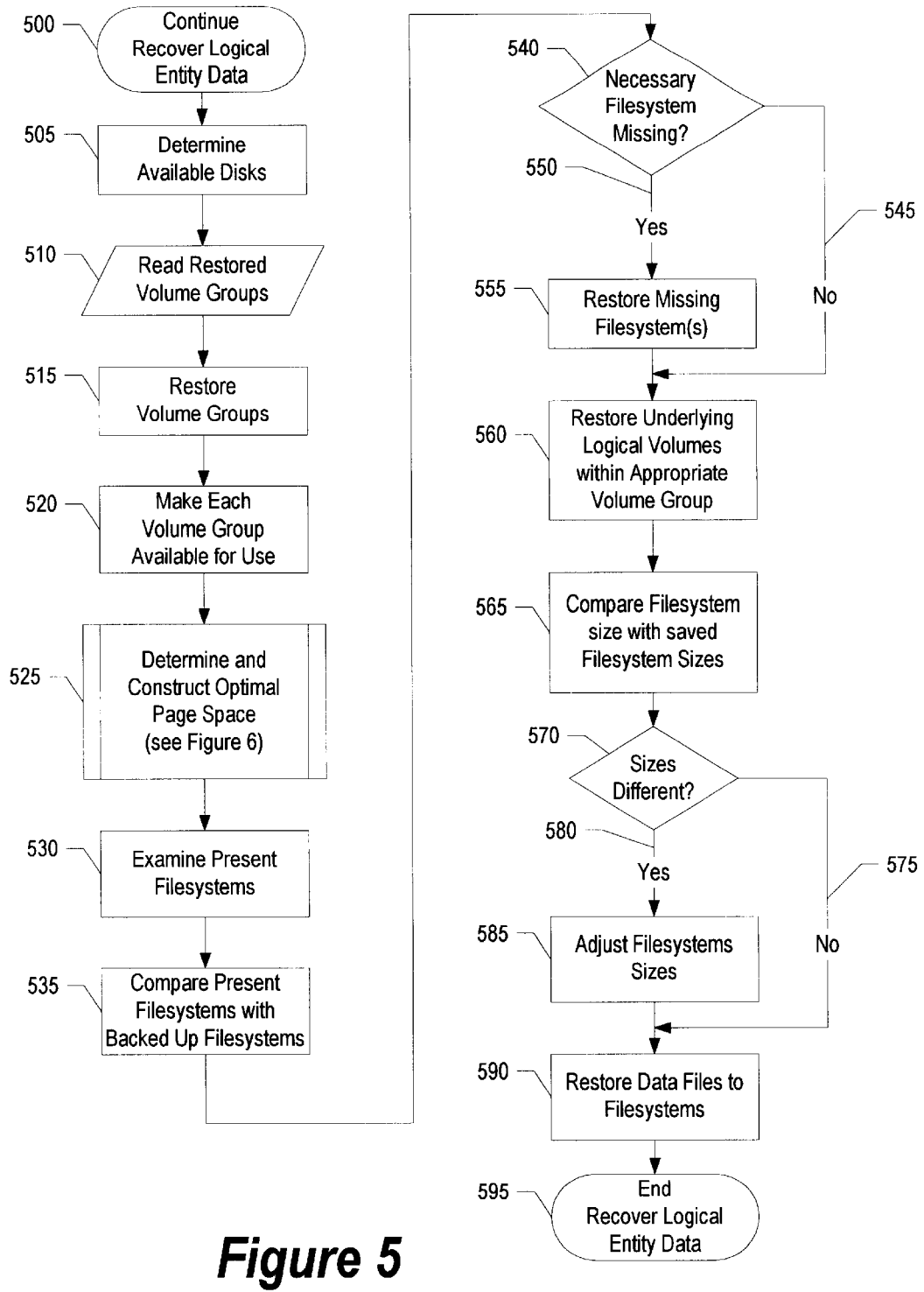
FIG. 5 is the continued flowchart for recovering logical entity data.

FIG. 5 shows a flowchart of the details involved in recovering logical entity data. Processing is continued from off-page connector 490 in FIG. 4 to commencement point 500 in FIG. 5. During the recovery process, each volume group that was present during the backup processing (see FIG. 3) is sequentially reconstructed using the disks available on the computer system. The available disks on the computer system are identified (step 505) for subsequent restoration processing steps. Volume group information is read from the backup data (input 510) and this information is used to restore the volume groups onto the computer system (step 515). Each restored volume group is "varied on" and made available to the computer system for reads and writes (step 520). The optimal amount of page space for use by the computer system is determined and constructed (predefined process 525, see FIG. 6 for further details). Page space, also called "swap space" in some operating systems, is used by the system for real memory "page-outs." When more real memory is requested than actually exists, some real memory is written to page space to free some real memory. When the memory that was paged out is needed again, it is read from the page space and written back to real memory. The computer system is analyzed to determine which filesystems are already present on the computer system (step 530). The filesystems that were previously backed up are compared against filesystems that are already present on the computer system (step 535) in order to restore the missing filesystems. The filesystems are processed and the program determines whether filesystems are missing (decision 540). If a filesystem are missing, "yes" branch 550 is taken and the missing filesystems are restored to the computer system (step 550). On the other hand, if no filesystems are missing, "no" branch 545 is taken and filesystems are not restored. Underlying logical volumes that exist within a volume group are restored using the backup data (step 560). After filesystems have been restored, their sizes are compared with the filesystem size recorded to the backup data (step 565). If the sizes are different, decision 570 branches to "yes" branch 580 whereupon the filesystem size on the computer system is adjusted (step 585) to match the filesystem size stored in the backup data. On the other hand, if the filesystem sizes are the same, "no" branch 575 is taken bypassing the adjustment step. When filesystems have been restored, the data that was backed up is restored using the commercial backup software that was used to backup the data (see FIG. 2, step 220). After the logical entity data and the file data have been restored to the computer system, the computer system is in a condition substantially similar to the condition existing prior to the backup processing. At this point, recovery processing terminates (step 595).

Figure 6:
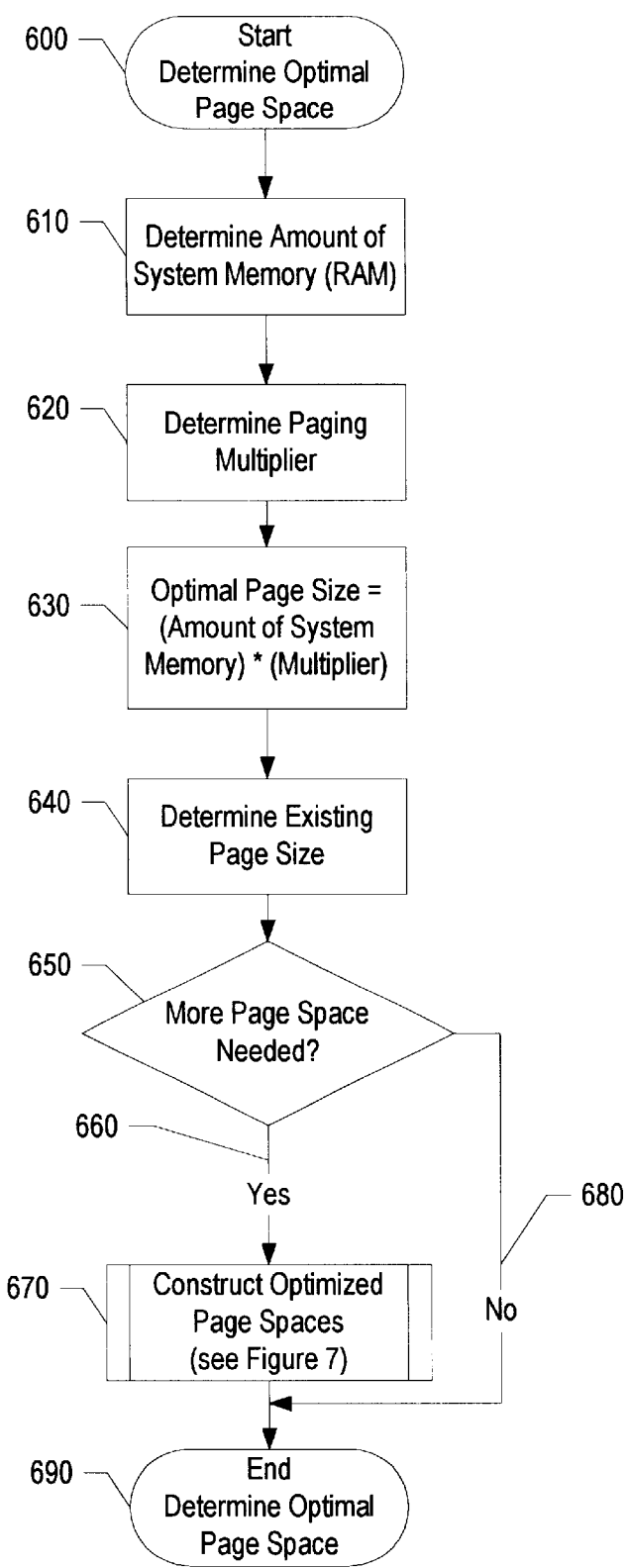
FIG. 6 is a flowchart for determining optimal page space.

FIG. 6 shows a flowchart for determining the optimal page space in the computer system. Processing commences at 600 whereupon the amount of system memory (RAM) is determined (step 610). The amount of system memory is determined by using a system provided API or using another method known for calculating the amount of physical memory available in a computer system. A paging multiplier is determined (step 620). In one embodiment, the paging multiplier defaults to two (2). In other embodiments, the paging multiplier is selected by the user. In yet another embodiment, the paging multiplier is determined by analyzing the amount of disk space available. If more disk space is available, a higher multiplier is selected, whereas if less disk space is available a lower multiplier is selected. The multiplier is multiplied by the amount of system memory to determine an optimal page space size (step 630). The existing page space size is determined (step 640) to use as a comparison with the optimal page space size. Decision 650 determines whether more page space is needed. If more page space is needed, "yes" branch 660 is taken whereupon predefined process 670 is performed to construct optimized page spaces on the computer system. See FIG. 7 for details involved in creating optimized page spaces on the computer system. If no more page space is needed, decision 650 branches to "no" branch 680 bypassing the construction of optimized page spaces. Determine optimal page space processing then terminates at 690.

Figure 7:
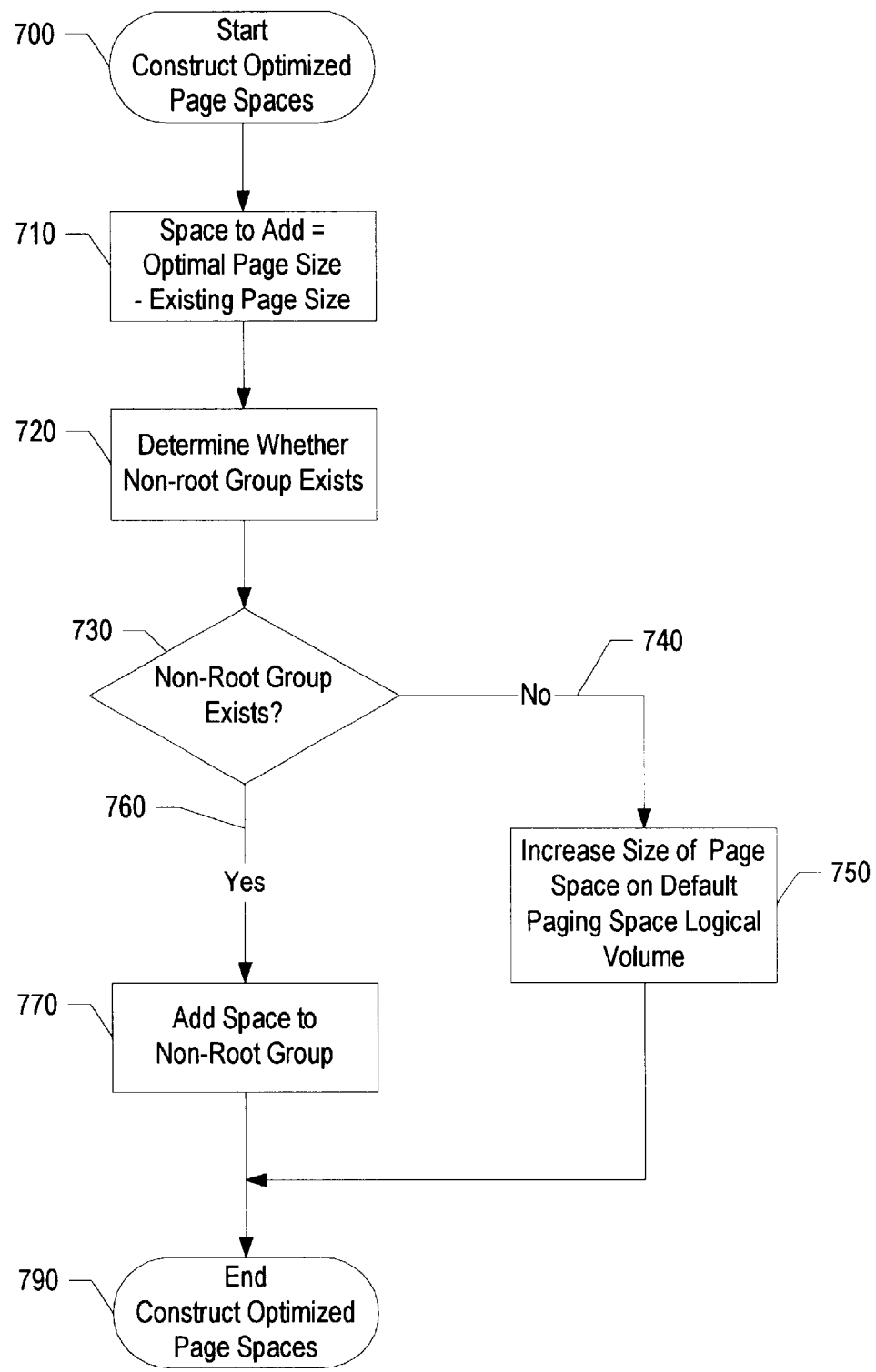
FIG. 7 is the continued flowchart for determining optimal page space.

FIG. 7 shows a flowchart for constructing optimized page spaces. Processing commences at 700 whereupon the amount of page space to add is determined (step 710). The amount of page space to add is calculated by subtracting the existing page space size (determined in step 640 in FIG. 6) from the optimal page space size (determined in step 630 in FIG. 6). The program determines whether a non-root volume group exists on the computer system. Because an optimal configuration does not place multiple paging spaces on the same root volume group disk, a non-root group volume is first examined for a possible addition to the page space. If a non-root volume group does exist, decision 730 branches to "yes" branch 760 whereupon the additional page space is added to the non-root volume group. On the other hand, if a non-root volume group does not exist, "no" branch 740 is taken whereupon the page size on the default paging space logical volume is increased (step 750). In a UNIX system, the size of the standard hd6 (the default UNIX paging space logical volume name) is increased so that hd6 no encompasses the optimal total of paging space partitions. A second paging space is not added, however, to a root volume group disk. Instead, the standard filesystem is expanded to achieve an optimal configuration given the disk limitations available on the computer system. The optimized page space construction process ends at 790 after the optimized page space has been constructed.

Figure 8:
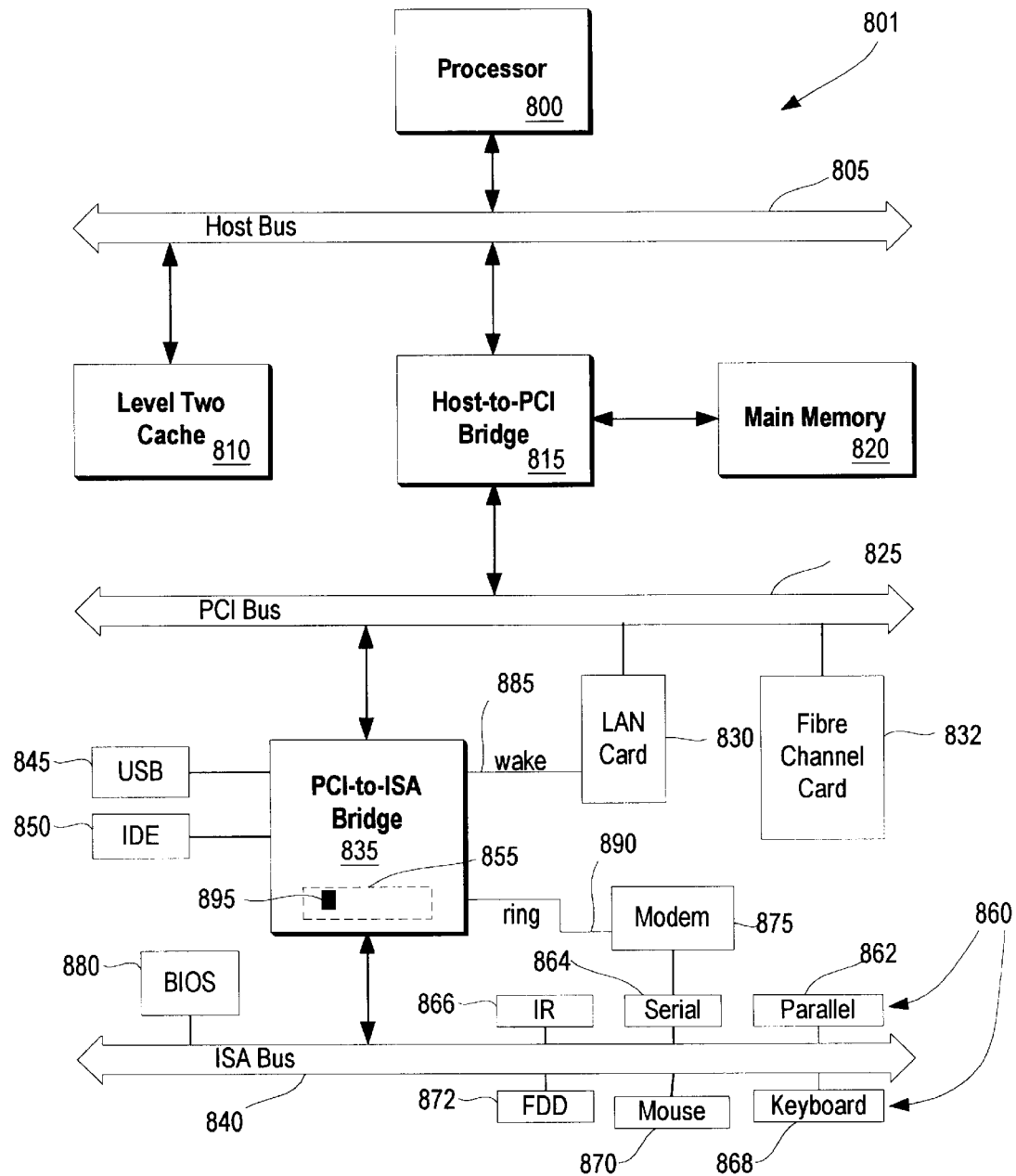
FIG. 8 is a block diagram of an information handling system capable of implementing the present invention.

FIG. 8 illustrates information handling system 801 which is a simplified example of a computer system capable of performing the present invention. Computer system 801 includes processor 800 which is coupled to host bus 805. A level two (L2) cache memory 810 is also coupled to the host bus 805. Host-to-PCI bridge 815 is coupled to main memory 820, includes cache memory and main memory control functions, and provides bus control to handle transfers among PCI bus 825, processor 800, L2 cache 810, main memory 820, and host bus 805. PCI bus 825 provides an interface for a variety of devices including, for example, LAN card 830. PCI-to-ISA bridge 835 provides bus control to handle transfers between PCI bus 825 and ISA bus 840, universal serial bus (USB) functionality 845, IDE device functionality 850, power management functionality 855, and can include other functional elements not shown, such as a real-time clock (RTC), DMA control, interrupt support, and system management bus support. Peripheral devices and input/output (I/O) devices can be attached to various interfaces 860 (e.g., parallel interface 862, serial interface 864, infrared (IR) interface 866, keyboard interface 868, mouse interface 870, and fixed disk (FDD) 872) coupled to ISA bus 840. Alternatively, many I/O devices can be accommodated by a super I/O controller (not shown) attached to ISA bus 840.

BIOS 880 is coupled to ISA bus 840, and incorporates the necessary processor executable code for a variety of low-level system functions and system boot functions. BIOS 880 can be stored in any computer readable medium, including magnetic storage media, optical storage media, flash memory, random access memory, read only memory, and communications media conveying signals encoding the instructions (e.g., signals from a network). In order to attach computer system 801 another computer system to copy files over a network, LAN card 830 is coupled to PCI-to-ISA bridge 835. Similarly, to connect computer system 801 to an ISP to connect to the Internet using a telephone line connection, modem 875 is connected to serial port 864 and PCI-to-ISA Bridge 835.

While the computer system described in FIG. 8 is capable of executing the invention described herein, this computer system is simply one example of a computer system. Those skilled in the art will appreciate that many other computer system designs are capable of performing the copying process described herein.

One of the preferred implementations of the invention is an application, namely, a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of backing up logical entity data from a computer system, said method comprising:
   identifying filesystems residing on the computer system; and
   recording filesystem data pertaining to the identified filesystems, wherein the filesystem data includes one or more volume group names corresponding to volume groups on the computer system, a filesystem size, one or more corresponding logical volume names, and one or more mount points, and wherein the filesystem data includes disk information corresponding to the recorded volume group names.

2. The method as described in claim 1 further comprising:
   recording network addresses used by the computer in accessing a computer network.

3. The method as described in claim 1 wherein the recording further includes writing to a removable nonvolatile media.

4. The method as described in claim 1 wherein the recording further includes writing to a network storage device, wherein the network storage device is connected to the computer system using a computer network.

5. The method as described in claim 1 further comprising:
   restoring the recorded filesystem data to a second computer system.

6. An information handling system comprising:
   one or more processors;
   a memory accessible by the processors;
   a nonvolatile storage device accessible by the processors;
   one or more filesystems stored on the nonvolatile storage device; and
   a logical entity backup tool, the logical entity backup tool including:
     means for identifying the filesystems residing on the nonvolatile storage device; and
     means for recording filesystem data pertaining to the identified filesystems, wherein the filesystem data includes one or more volume group names corresponding to volume groups on the computer system, and wherein the filesystem data includes disk information corresponding to the recorded volume group names.

7. The information handling system as described in claim 6 further comprising:
   a computer network accessible by the computer system;
   wherein the logical entity backup tool further includes:
     means for recording network addresses used by the computer in accessing the computer network.

8. The information handling system as described in claim 6 further comprising:
   a removable nonvolatile storage device;
   wherein the means for recording further includes:
     means for writing to the removable nonvolatile storage device.

9. The information handling system as described in claim 6 further comprising:
   a computer network accessible by the computer system;
   wherein the means for recording further includes:
     means for writing to a network storage device, wherein the network storage device is connected to the computer network.

10. The information handling system as described in claim 6 further comprising:
a logical entity recovery tool, the logical entity recovery tool including:
means for restoring the recorded filesystem data to a second computer system.

11. A computer program product for backing up logical entity data from a computer system, said computer program product comprising:
means for identifying filesystems residing on the computer system; and
means for recording filesystem data pertaining to the identified filesystems, wherein the filesystem data includes one or more volume group names corresponding to volume groups on the computer system, and wherein the filesystem data includes disk information corresponding to the recorded volume group names.

12. The computer program product as described in claim 11 further comprising:
means for recording network addresses used by the computer in accessing a computer network.

13. The computer program product as described in claim 11 wherein the recording further includes means for writing to a removable nonvolatile media.

14. The computer program product as described in claim 11 wherein the recording further includes means for writing to a network storage device, wherein the network storage device is connected to the computer system using a computer network.

15. The computer program product as described in claim 11 further comprising:
means for restoring the recorded filesystem data to a second computer system.

* * * * *